United States Patent [19]
Tanimoto et al.

[11] 3,937,664
[45] Feb. 10, 1976

[54] OIL FILLED ELECTRICAL DEVICE

[75] Inventors: Fumio Tanimoto; Mineaki Nishimatsu, both of Kyoto; Sadayoshi Mukai, Katano; Kaname Ishida, Kyoto, all of Japan

[73] Assignees: Nissin Electric Co., Ltd., Kyoto; Sugai Chemical Industry Co., Ltd., Wakayama, both of Japan

[22] Filed: Mar. 25, 1974

[21] Appl. No.: 454,132

[30] Foreign Application Priority Data
Mar. 29, 1973 Japan................................ 48-35921

[52] U.S. Cl................. 252/64; 336/94; 174/110 R; 317/258
[51] Int. Cl.²...................... H01B 3/18; H01F 27/02
[58] Field of Search........... 174/110, 17 LF; 252/64, 252/52 R; 336/94; 260/612 R; 317/258

[56] References Cited
UNITED STATES PATENTS
3,240,817   3/1966   Carlson................................ 260/613

*Primary Examiner*—John D. Welsh
*Attorney, Agent, or Firm*—Christensen, O'Connor, Garrison & Havelka

[57] ABSTRACT

An oil-filled electrical device comprising a casing, an electrical device element in the casing and an insulating oil consisting essentially of one or more 2-diphenylalkylether having the structural formula of

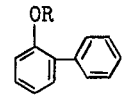

wherein R is the alkyl group expressed as $C_nH_{2n+1}$ wherein R is 1  $n423.8$.

10 Claims, 3 Drawing Figures

OIL FILLED ELECTRICAL DEVICE

BACKGROUND OF THE INVENTION

This invention relates to an oil-filled or oil-immersed electrical device.

Various types of electrical devices which are filled with insulating oil are widely used in, for example, power systems. Recently, with ever increasing demand for a greater and greater supply of electrical power, such electrical devices are becoming of greater and greater capacity and more and more capable of withstanding higher voltages.

One of the factors that determine the operating efficiency of such oil-filled or oil-immersed electrical devices is the characteristics of the oil that fills the device together with other component parts thereof. At present mineral oils and diphenyl chloride are most widely used for this purpose. However, mineral oils have lower dielectric constants and strength and also are less gas-absorbent so that they cannot provide sufficient properties required for high voltage and capacity types of such electrical devices and with such mineral oils it is difficult to make the device compact in size.

On the contrary, diphenyl chloride has a higher dielectric constant and strength. However, it is so toxic to the human as well as animal life that in view of environmental pollution the use of this material is undesirable.

Accordingly, the primary object of the invention is to provide such electrical devices which have high operating efficiency.

Another object of the invention is to provide oil-filled or oil-immersed electrical devices having high operating efficiency which is achieved by the use of such insulating oils having good characteristics as such oils.

Still another object of the invention is to provide oil-immersed or oil-filled electrical devices employing insulating oils which are not toxic to life.

Still another object of the invention is to improve the characteristics of oil-filled electrical devices through utilization of those insulating oils which have greater dielectric constants and strengths and are more gas-absorbent than the mineral oils hitherto employed for the same purpose.

A further object of the invention is to provide such oil-filled electrical devices as aforesaid which are compact in size.

Additional object of the invention is provide an insulating oil for use in oil-filled or oil-immersed electrical devices, which has a higher dielectric constant and strength and is more gas-absorbent than the conventional mineral oils.

BRIEF DESCRIPTION OF THE DRAWINGS

The invention will be described with reference to the accompanying drawings, wherein.

SUMMARY OF THE INVENTION

Figure 1:
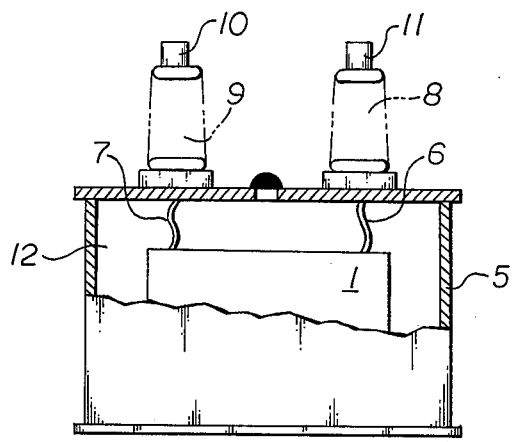
FIG. 1 is a front view, partly broken, of an oil-filled condenser constructed in accordance with the invention.

This invention is directed to oil-filled electrical devices comprising a casing, an electrical device element disposed in the casing and an insulating oil consisting essentially of one or more 2-diphenylalkylethers (ortho substituted compounds) wherein the alkyl group contains from 1 to 8 carbon atoms. These 2-diphenylalkylethers have the structural formula

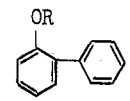

wherein R is the alkyl group expressed as $C_nH_{2n+1}$ wherein $1 \leq n \leq 8$.

The 2-diphenylalkylether compound include any type of isomers i.e. normal chain, branched chain and primary, secondary and tertiary alkyls.

The oil-filled electrical devices of the invention employ the above compounds either singly or in mixture.

DETAILED DESCRIPTION OF THE INVENTION AND THE PREFERRED EMBODIMENTS

The characteristics of the compounds as compared with those of the conventional mineral oil are given in below TABLE I. In TABLE I through V, (A) to (M) indicate the insulating oils of the present invention with which the electrical apparatus of the invention may be filled, while (N) indicates an insulating oil to be compared with those of the present invention and (P) is the mineral oil used in the conventional oil-filled electrical apparatus.

In TABLE I, the visible gas generating voltage is the voltage level at which a piece of paper immersed with the oil on which an increasing voltage is impressed comes to produce gas immediately before dielectric breakdown occurs. Generally, the visible gas generating voltage may be considered as a measure of the dielectric breakdown voltage of the oil-immersed paper.

The formulae of the compounds employed and the mixing ratios of them are given below in (A) through (N):

A. 2-diphenylmethylether

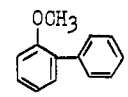

B. 2-diphenylethylether

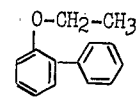

C. 2-diphenylnormalpropylether

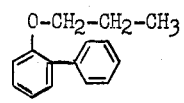

D. 2-diphenylnormalbutylether

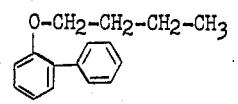

E. 2-diphenylnormalhexylether

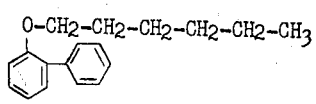

F. 2-diphenylisopropylether

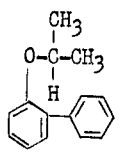

G. 2-diphenylisopentylether

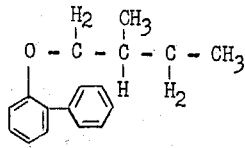

H. 2-diphenyltertiarybutylether

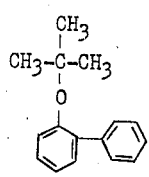

I. 2-diphenyl-1,1-dimethylbutylether

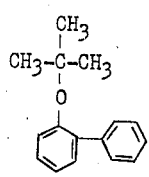

J. Mixture of 2-diphenylmethylether (A) and 2-diphenylethylether (B), the ratio of A to B being 30:70.

K. Mixture of 2-diphenylethylether (B) and 2-diphenyl-1,1-dimethylbutylether (I), the ratio of B to I being 70:30.

L. 2-diphenylnormaloctylether

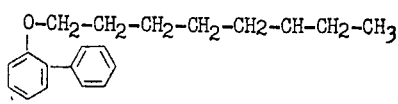

M. 2-diphenylisooctylether

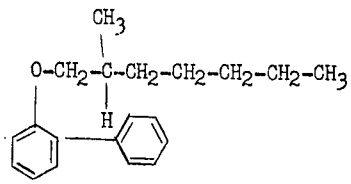

N. 2-diphenylnormalnonylether (to be used as a reference compound, with the alkyl group having 9 carbon atoms)

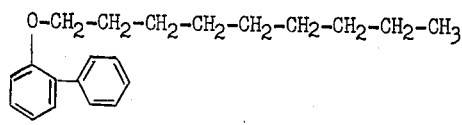

TABLE I

| Characteristics Insulating Oil | Flash Point (°C) | Viscosity at 30°C (cst) | Viscosity at 75°C (cst) | Dielectric Constant at 80°C |
|---|---|---|---|---|
| (A) Single Compound | 132 | 9.5 | 5.0 | 3.65 |
| (B) " | 134 | 10.5 | 5.5 | 3.50 |
| (C) " | 136 | 10.0 | 5.5 | 3.40 |
| (D) " | 137 | 11.0 | 6.5 | 3.20 |
| (E) " | 142 | 16.0 | 9.5 | 2.65 |
| (F) " | 136 | 10.5 | 5.0 | 3.45 |
| (G) " | 140 | 15.0 | 9.0 | 2.60 |
| (H) " | 138 | 11.0 | 7.0 | 2.75 |
| (I) " | 143 | 16.5 | 10.0 | 2.65 |
| (J) Mixture | 133 | 10.0 | 5.5 | 3.56 |
| (K) " | 136 | 11.0 | 6.0 | 3.10 |
| (L) Single Compound | 144 | 18.5 | 11.0 | 2.45 |
| (M) " | 144 | 18.0 | 11.5 | 2.60 |
| (N) Single Compound | 148 | 24.0 | 15.5 | 2.32 |
| (P) Mineral Oil | 132 | 12.0 | 7.0 | 2.26 |

| Characteristics Insulating Oil | Dielectric Loss Tangent at 80°C (%) | Volume Resistivity at 80°C (Ω-cm) | Breakdown Voltage at 20°C (kV/2.5mm) | Visual Gas Producing Voltage at 20°C (kV/mm) |
|---|---|---|---|---|
| (A) Single Compound | 0.070 | 1.0×10¹⁴ | 74 | 68.5 |
| (B) " | 0.047 | 3.5×10¹⁴ | 77 | 67.5 |
| (C) " | 0.040 | 3.0×10¹⁴ | 78 | 67.0 |
| (D) " | 0.040 | 3.0×10¹⁴ | 77 | 66.0 |
| (E) " | 0.035 | 3.0×10¹⁴ | 80 | 62.5 |
| (F) " | 0.040 | 2.5×10¹⁴ | 78 | 66.8 |
| (G) " | 0.030 | 3.5×10¹⁴ | 78 | 64.5 |
| (H) " | 0.030 | 3.0×10¹⁴ | 77 | 66.2 |

TABLE I-continued

| Characteristics Insulating Oil | Dielectric Loss Tangent at 80°C (%) | Volume Resistivity at 80°C (Ω-cm) | Breakdown Voltage at 20°C (kV/2.5mm) | Visual Gas Producing Voltage at 20°C (kV/mm) |
|---|---|---|---|---|
| (I) " | 0.030 | $3.1 \times 10^{14}$ | 80 | 62.0 |
| (J) Mixture | 0.051 | $2.5 \times 10^{14}$ | 75 | 67.5 |
| (K) " | 0.045 | $2.5 \times 10^{14}$ | 76 | 64.0 |
| (L) Single Compound | 0.030 | $3.5 \times 10^{14}$ | 79 | 56.0 |
| (M) " | 0.030 | $3.0 \times 10^{14}$ | 78 | 55.5 |
| (N) Single Compound | 0.025 | $4.0 \times 10^{14}$ | 80 | 49.0 |
| (P) Mineral Oil | 0.030 | $3.5 \times 10^{14}$ | 79 | 46.5 |

As obvious from TABLE I, the compounds A – M of the present invention to be used as insulating oil to fill the oil-filled electrical device have higher dielectric constants and higher visible gas generating voltages than the conventional mineral oil P used in the prior art oil-filled electrical devices or 2-diphenylnormalnonylether N with the alkyl group of 9 carbon atoms, used as the insulating oil in the reference oil-filled electrical device.

Figure 2:
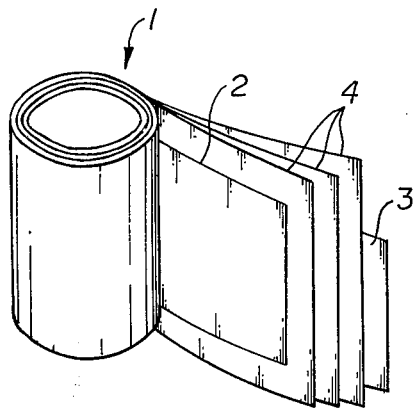
FIG. 2 is a perspective view of a partly broken element used in the condenser of FIG. 1.

Now an oil-filled condenser constructed in accordance with the invention will be described with reference to the accompanying drawings. In FIGS. 1 and 2, there is shown an oil-filled condenser comprising a condenser element 1 consisting of a pair of thin electrode foils 2 and 3 and a plurality of piled thin dielectric sheets 4 sandwiched between the electrodes, all these being wound into a suitable cylindrical shape in accordance with desired electrical characteristics to be attained, as shown in FIG. 2.

A casing 5 encloses the cylindrical element 1, from which a pair of leads 6 and 7 are connected to terminals 10 and 11 provided on top of the casing. Insulating oil 12 fills the interior of the casing 5.

TABLE II and III show various characteristics of the condenser constructed in the above manner of FIGS. 1 and 2, with the previously mentioned compounds A – N and P used as the insulating oil 12. In TABLE II, in the condensers tested, the electrodes 2 and 3 are made of aluminium foils 10 μ thick, 23 cm wide and 4.35 meters long, and the dielectric 4 is made of five piled sheets of insulating paper 55 μ thick, 26 cm wide and 6.5 meters long and having a density of 0.82 g/cm³, the foils and dielectric sheets being put together and wound into the cylindrical element 1. In TABLE III, the electrodes 2 and 3 are made of aluminum foils 10 μ thick, 23 cm wide and 4.35 meters long, and the dielectric 4 comprises sheets of insulating paper 9 μ thick, 26 cm wide and 6.5 meters long with a density of 0.82 g/cm³ and sheets of polypropylene film 9 μ thick, 26 cm wide and 6.5 meters long, the number of the dielectric sheets being five in all, and the foils and dielectric sheets being put together and wound into the cylindrical element 1.

In TABLES II and III, the long time withstand AC voltage ratio are given with those of the example P being taken as 100.

TABLE II

| Characteristics Insulating Oil | Dielectric Constant at 20°C | Dielectric Less Tangent at 20°C (%) | Insulating Resistance at 20°C (Ω/F) | Corona Start Voltage at 20°C (kv/mm) |
|---|---|---|---|---|
| (A) | 4.37 | 0.31 | 10,000 | 37 |
| (B) | 4.26 | 0.25 | 20,000 | 36 |
| (C) | 4.18 | 0.23 | 18,000 | 36 |
| (D) | 4.05 | 0.23 | 18,000 | 36 |
| (E) | 3.67 | 0.21 | 18,000 | 35 |
| (F) | 4.22 | 0.23 | 17,000 | 36 |
| (G) | 3.63 | 0.20 | 20,000 | 36 |
| (H) | 3.73 | 0.20 | 18,000 | 36 |
| (I) | 3.67 | 0.20 | 19,000 | 35 |
| (J) | 4.30 | 0.26 | 17,000 | 36 |
| (K) | 3.98 | 0.24 | 17,000 | 34 |
| (L) | 3.53 | 0.20 | 20,000 | 31 |
| (M) | 3.63 | 0.20 | 18,000 | 31 |
| (N) | 3.43 | 0.19 | 22,000 | 31 |
| (P) | 3.40 | 0.20 | 20,000 | 30 |

| Characteristics Insulating Oil | Corona Extinction Voltage at 20°C (kV/mm) | Long Time Withstand AC Voltage Ratio | Volume Ratio |
|---|---|---|---|
| (A) | 13 | 128 | 48 |
| (B) | 13 | 124 | 52 |
| (C) | 14 | 124 | 53 |
| (D) | 12 | 124 | 55 |
| (E) | 14 | 120 | 64 |
| (F) | 12 | 124 | 52 |
| (G) | 10 | 124 | 61 |
| (H) | 13 | 124 | 59 |
| (I) | 11 | 120 | 64 |
| (J) | 14 | 124 | 52 |
| (K) | 12 | 120 | 59 |
| (L) | 9 | 108 | 83 |

TABLE II-continued

| Characteristics<br>Insulating Oil | Corona Extinction Voltage at 20°C (kV/mm) | Long Time Withstand AC Voltage Ratio | Volume Ratio |
|---|---|---|---|
| (M) | 9 | 106 | 83 |
| (N) | 7 | 103 | 93 |
| (P) | 6 | 100 | 100 |

TABLE III

| Characteristics<br>Insulating Oil | Dielectric Constant at 20°C | Dielectric Loss Tangent at 20°C (%) | Insulating Resistance at 20°C (Ω/F) | Corona Start Voltage at 20°C (kV/mm) |
|---|---|---|---|---|
| (A) | 2.82 | 0.06 | 38,000 | 81 |
| (B) | 2.64 | 0.05 | 43,000 | 80 |
| (C) | 2.63 | 0.05 | 42,000 | 80 |
| (D) | 2.60 | 0.05 | 42,000 | 79 |
| (E) | 2.52 | 0.05 | 42,000 | 76 |
| (F) | 2.63 | 0.05 | 41,000 | 80 |
| (G) | 2.52 | 0.05 | 43,000 | 78 |
| (H) | 2.54 | 0.05 | 42,000 | 79 |
| (I) | 2.52 | 0.05 | 42,000 | 75 |
| (J) | 2.65 | 0.05 | 41,000 | 80 |
| (K) | 2.59 | 0.05 | 41,000 | 77 |
| (L) | 2.50 | 0.05 | 43,000 | 68 |
| (M) | 2.52 | 0.05 | 42,000 | 66 |
| (N) | 2.48 | 0.05 | 44,000 | 63 |
| (P) | 2.46 | 0.05 | 43,000 | 61 |

| Characteristics<br>Insulating Oil | Corona Extinction Voltage at 20°C (kV/mm) | Long Time Withstand AC Voltage Ratio | Volume Ratio |
|---|---|---|---|
| (A) | 45 | 126 | 55 |
| (B) | 42 | 125 | 60 |
| (C) | 43 | 124 | 60 |
| (D) | 40 | 123 | 62 |
| (E) | 44 | 117 | 67 |
| (F) | 42 | 124 | 61 |
| (G) | 45 | 121 | 67 |
| (H) | 39 | 123 | 64 |
| (I) | 41 | 119 | 70 |
| (J) | 46 | 125 | 59 |
| (K) | 40 | 121 | 65 |
| (L) | 36 | 112 | 79 |
| (M) | 33 | 110 | 81 |
| (N) | 18 | 104 | 92 |
| (P) | 8 | 100 | 100 |

First, the characteristics of the oil-filled condenser with insulating paper only used as the dielectric (which will be refered to as the Pa oil-filled condenser) will be considered. As is obvious from TABLE II, in the Pa oil-filled condenser with the compounds A – M of the present invention used as the insulating oil the dielectric constant is 4 to 28% higher, the corona start and extinction voltages are 3 to 23% and 50 to 230% higher, respectively, and long time withstand AC voltage is 6 to 28% higher than those of the Pa oil-filled condenser filled with the mineral oil N, and consequently the volume of size is reduced to 48 to 83% of that of the conventional mineral oil-filled condenser.

In the Pa oil-filled condenser filled with the compound N, that is 2-diphenylnormalnonylether, however, only the dielectric constant and the long time withstand AC voltage are a little higher than in the Pa oil-filled condenser filled with the conventional mineral oil. This means that the compound N is not so effective. This is because of the property of 2-diphenylnormalnonylether. It is well known that generally if armoatic compounds have too many carbon atoms of the alkyl group in the side chain (that is, the proportion of the aromatic component in one molecule is small), the electrical characteristics are deteriorated, and this may be the reason why the compound N is not so effective.

Next, the characteristics of the oil-filled condenser employing a combination of insulating paper and plastic film as the dielectric material (which will be referred to as the Pf oil-filled condenser) will be considered. As will be obvious from TABLE III, when the 2-diphenylalkylether compounds A – M of the present invention are employed in the Pf oil-filled condenser, the dielectric constant is 2 to 14% higher, the corona start and extinction voltages are 8 to 32% and 410 to 560% higher, respectively, and the long time withstand AC voltage is 10 to 26% higher than the Pf oil-filled condenser filled with the conventional mineral oil P, and consequently the volume or size is reduced to 55 to 80% of the conventional Pf mineral oil-filled condenser.

On the other hand, in the Pf oil-filled condenser filled with 2-diphenylnormalnonylether compound N the dielectric constant and the long time withstand AC voltage are a little higher than the Pf oil-filled condenser filled with the conventional mineral oil P. This means that the compound N is not very effective.

Figure 3:
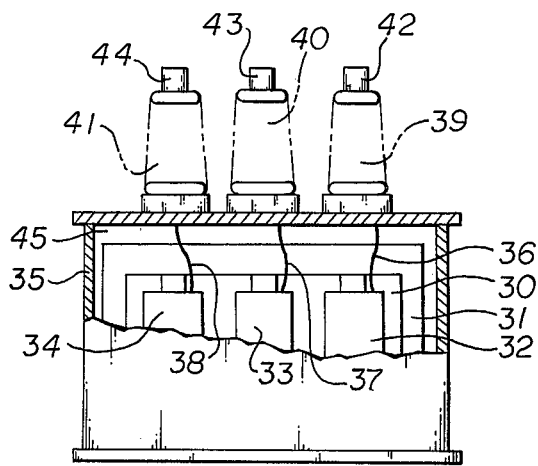
FIG. 3 is a front view, partly broken, of an oil-filled transformer constructed in accordance with the invention.

FIG. 3 shows an oil-filled transformer including an element 30 comprising a core 31 and a plurality of high and low voltage windings 32, 33 and 34 enclosed in a casing 35. Leads 36, 37 and 38 from the windings 32, 33 and 34 are connnected to terminals 42, 43 and 44, respectively, passing through bushings 39, 40, 41. Insulating oil 45 fills the interior space of the casing 35.

TABLE IV shows various characteristics of the transformer with some of the previously mentioned compounds used as the insulating oil. The transformer used for the test is a three-phase, 100kVA and 60 Hz outdoor type. In TABLE IV, the oil amount ratio, the weight ratio and the volume ratio are given for the transformers filled with the respective compounds, with those of the reference transformer filled with the mineral oil P being taken as 100.

TABLE IV

| Characteristics<br>Insulating<br>Oil | Dielectric Loss Tangent (%) | | Insulating Resistance (MΩ) | | Oil Amount Ratio |
|---|---|---|---|---|---|
| | at 20°C | at 80°C | at 20°C | at 80°C | |
| (B) | 1.0 | 1.7 | $8.0 \times 10^4$ | $3.0 \times 10^3$ | 54 |
| (D) | 0.9 | 1.6 | $7.5 \times 10^4$ | $3.5 \times 10^3$ | 55 |
| (G) | 0.9 | 1.6 | $7.0 \times 10^4$ | $3.0 \times 10^3$ | 55 |
| (H) | 0.8 | 1.7 | $7.0 \times 10^4$ | $3.5 \times 10^3$ | 55 |
| (N) | 0.8 | 1.6 | $7.5 \times 10^4$ | $4.0 \times 10^3$ | 60 |
| (P) | 1.0 | 2.0 | $4.5 \times 10^4$ | $2.0 \times 10^3$ | 100 |

| Characteristics<br>Insulating<br>Oil | Weight Ratio | Volume Ratio |
|---|---|---|
| (B) | 85 | 75 |
| (D) | 86 | 76 |
| (G) | 88 | 78 |
| (H) | 89 | 78 |
| (N) | 93 | 85 |
| (P) | 100 | 100 |

As will be seen from the above table, in the transformer filled with the 2-diphenylalkylether compounds B, D, G, H of the present invention the amount of oil is reduced to 54 – 55%, the weight is reduced to 85 – 89% and consequently the volume or size is reduced to 75 – 78% of the transformer filled with the conventional mineral oil P.

With respect to the transformer filled with the 2-diphenylnormalnonylether compound N, the amount of oil is reduced to 60% of the transformer filled with the conventional mineral oil P, but the weight is reduced only little and as a whole the use of the compound N is found not very effective.

TABLE V shows various characteristics of an oil-filled cable constructed in accordance with the invention. The cable comprises a 15 φ mm compressed circular conductor, two sheets of shield carbon paper wound thereon, a 9.0 mm thick insulating layer thereon, a sheet of carbon paper and brass tape wound further thereon and an aluminum sheath to cover the above composite structure. As the insulating layer the previously mentioned 2-diphenylalkylether compounds A, C, E, F were used, as well as the compound N and the mineral oil P for comparison.

It is clear from TABLE V that in the cable filled with the 2-diphenylalkylether compounds A, C, E and F, the breakdown alternating current voltage is 19–26% higher and the impulse strength is 10–20% higher than in the cable filled with the conventional mineral oil, and the diameter of the cable can accordingly be made smaller.

TABLE V

| Characteristics<br>Insulating<br>Oil | Breakdown AC Voltage at 20°C (kV/mm) | Impulse Strength at 20°C (kV/mm) | Dielectric Loss Tangent at 20°C (%) |
|---|---|---|---|
| (A) | 58.0 | 128 | 0.20 |
| (C) | 57.0 | 125 | 0.21 |
| (E) | 56.5 | 123 | 0.18 |
| (F) | 55.0 | 116 | 0.19 |
| (N) | 47.0 | 109 | 0.19 |
| (P) | 46.0 | 105 | 0.22 |

As mentioned above in detail, the oil-filled electrical devices of the invention are substantially improved in the electrical characteristics such as the dielectric constant, the long time withstand AC voltage, etc. and can be made compact in size and light in weight as compared with those filled with the conventional mineral oil. Also, the visible gas generating voltage is high and the ability to absorb gas and the corona characteristic are greatly improved so that occurrence of corona can be prevented under normal operating conditions and also any gas produced by instant abnormal voltage can be instantly absorbed, thereby maintaining the electrical characteristics of the devices very stable for a long time.

It has been found that by using a mixture of two or more of the above-mentioned compounds it is possible to attain substantially the same results as with the use of a single compound.

Contrary to diphenylchloride the compounds of the invention have little toxicity and may safely be used from the viewpoint of environmental pollution and sanitation.

1. An oil-filled electrical device comprising a casing, an electrical device element in said casing and an insulating oil consisting essentially of one or more 2-diphenylalkylethers having the structural formula of

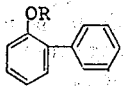

wherein R is the alkyl group expressed as $C_nH_{2n+1}$ wherein $1 \leq n \leq 8$.

2. The device of claim 1, wherein said insulating oil consists essentially of a mixture of a plurality of 2-diphenylalkylether compounds.

3. The device of claim 1, wherein said element is a condenser element.

4. The device of claim 1, wherein said element is a transformer element.

5. The device of claim 1, wherein said element is a cable element.

6. The device of claim 2, wherein said element is a condenser element.

7. The device of claim 2, wherein said element is a transformer element.

8. The device of claim 2, wherein said element is a cable element.

9. The device of claim 1, wherein said insulating oil consists essentially of a mixture of at least two of said 2-diphenylalkylethers, one of which is more than 30% of the total amount of said oil.

10. The device of claim 1, wherein said insulating oil consists essentially of a mixture of at least two of said 2-diphenylalkylethers, one of which is from 30 to 70% of the total amount of said oil.

* * * * *